(12) United States Patent
Pfeifer et al.

(10) Patent No.: US 11,229,894 B2
(45) Date of Patent: Jan. 25, 2022

(54) MICRO-REACTOR AND METHOD IMPLEMENTATION FOR METHANATION

(71) Applicant: KARLSRUHER INSTITUT FUER TECHNOLOGIE, Karlsruhe (DE)

(72) Inventors: Peter Pfeifer, Linkenheim (DE); Michael Belimov, Karlsruhe (DE)

(73) Assignee: KARLSRUHER INSTITUT FUER TECHNOLOGIE, Karlsruhe (DE)

( * ) Notice: Subject to any disclaimer, the term of this patent is extended or adjusted under 35 U.S.C. 154(b) by 326 days.

(21) Appl. No.: 16/305,473

(22) PCT Filed: Jun. 7, 2017

(86) PCT No.: PCT/EP2017/063778
§ 371 (c)(1),
(2) Date: Nov. 29, 2018

(87) PCT Pub. No.: WO2017/211864
PCT Pub. Date: Dec. 14, 2017

(65) Prior Publication Data
US 2020/0324265 A1 Oct. 15, 2020

(30) Foreign Application Priority Data
Jun. 7, 2016 (DE) .......................... 102016110498.1

(51) Int. Cl.
*B01J 19/00* (2006.01)

(52) U.S. Cl.
CPC .. *B01J 19/0093* (2013.01); *B01J 2219/00783* (2013.01); *B01J 2219/00835* (2013.01); *B01J 2219/00873* (2013.01)

(58) Field of Classification Search
CPC .... B01J 19/00; B01J 19/0093; B01J 2219/00; B01J 2219/00781; B01J 2219/00783; B01J 2219/00819; B01J 2219/00835; B01J 2219/00873
See application file for complete search history.

(56) References Cited

U.S. PATENT DOCUMENTS

| | | | |
|---|---|---|---|
| 4,839,391 A | 6/1989 | Range | |
| 5,811,062 A | 9/1998 | Wegeng | |
| 6,026,115 A | 2/2000 | Higashi | |
| 6,192,596 B1 | 2/2001 | Bennett | |
| 6,200,536 B1 | 3/2001 | Tonkovich | |
| 6,537,506 B1 * | 3/2003 | Schwalbe | B01F 5/0604 422/129 |
| 7,297,324 B2 | 11/2007 | Tegrotenhuis | |
| 7,883,670 B2 * | 2/2011 | Tonkovich | F28F 3/048 422/129 |
| 8,053,125 B2 * | 11/2011 | Nakagawa | H01M 8/0267 429/434 |
| 9,174,387 B2 * | 11/2015 | Luzenski | B01J 8/16 |

(Continued)

FOREIGN PATENT DOCUMENTS

| | | |
|---|---|---|
| DE | 102005004075 A1 | 8/2006 |
| DE | 202010000262 U1 | 5/2010 |

(Continued)

*Primary Examiner* — Natasha E Young
(74) *Attorney, Agent, or Firm* — Abel Schillinger, LLP

(57) ABSTRACT

The invention relates to a reactor, preferably microreactor, for methanation, and to the operation of this reactor, i.e. to the process regime for preparation of methane.

21 Claims, 4 Drawing Sheets

(56) References Cited

U.S. PATENT DOCUMENTS

| | | |
|---|---|---|
| 9,302,243 B2 | 4/2016 | Kockmann |
| 2002/0106311 A1 | 8/2002 | Golbig |
| 2003/0152488 A1 | 8/2003 | Tonkovich |
| 2008/0248344 A1 | 10/2008 | Schmitt |
| 2009/0087359 A1 | 4/2009 | Roberge |
| 2012/0076705 A1 | 3/2012 | Kockmann |

FOREIGN PATENT DOCUMENTS

| | | |
|---|---|---|
| EP | 0241902 A1 | 10/1987 |
| EP | 1724010 A2 | 11/2006 |
| EP | 2213367 A1 | 8/2010 |
| WO | 2007112945 A1 | 10/2007 |
| WO | 2011134630 A1 | 11/2011 |

* cited by examiner

MICRO-REACTOR AND METHOD IMPLEMENTATION FOR METHANATION

This application is a national stage application claiming priority to PCT/EP2017/063778, now WO2017/211864, filed on Jun. 7, 2017, which claims priority to German Patent Application Serial No. DE102016110498.1, filed on Jun. 7, 2016.

BACKGROUND OF THE INVENTION

1. Field of the Invention

The invention relates to a reactor, preferably a microreactor, for methanation, and to the operation of this reactor, i.e. to the process regime for preparation of methane.

2. Discussion of Background Information

In order to achieve a switch from fossil to renewable energy carriers, it is first necessary to provide means of storing energy. Especially since power from wind energy and solar energy is subject to high diurnal and seasonal fluctuations.

One approach is the storage of energy in chemical compounds, especially as hydrogen, oxygen or short-chain hydrocarbons, for example methane.

This involves using, for example, power from wind energy and solar energy which is not consumed immediately in order to split water electrolytically into hydrogen and oxygen. In a subsequent synthesis with the $CO_2$ emitted from biogas plants, for example, it is thus possible to synthesize hydrocarbons, for example methane, and store them for later use. These hydrocarbons can be used directly by combustion for energy generation, as raw materials for further synthesis or for reconversion to power and hence generation of electrical energy. It is thus possible to achieve a stable supply of power from wind energy and solar energy.

Since renewable energy is available only locally, there must also be decentralized approaches for storage of energy or for production and storage of the corresponding "energy-storing" chemical compounds.

Such decentralized plants differ distinctly both in terms of construction and in terms of process regime from the large industrial plants known to date. DE 10 2005 004 075 B4 discloses, for example, a ceramic microreactor in which a homogeneous distribution of the stream of matter is achieved by means of multiple baffles in order to be able to conduct methanation at temperatures of 200° C. to 1000° C.

Microreactors or devices for generation of energy comprising microstructures are also known from US 20020106311, U.S. Pat. Nos. 6,200,536 B1, 7,297,324 B2, 6,192,596 B1 and 5,811,062 A.

Processes for preparing methane are known, for example, from EP 2 213 367 A1, EP 0 241 902 A1 or U.S. Pat. No. 7,297,324 B2. These involve preparing methane from hydrogen, carbon monoxide and carbon dioxide.

A problem in the preparation of methane from $H_2$, $CO_2$ and CO is the temperature configuration in the reactor. One reaction has to be effected at temperatures of at least 200° C. in order to prevent the formation of metal carbonyls that can mean discharge of catalyst from the reactor. On the other hand, a minimum conversion of 70% $CO_2$ should be achieved, which is thermodynamically possible only at low temperatures around 200° C. In this way, methane can be prepared in the necessary purity and the complexity involved in removing the remaining $CO_2$ can be avoided.

Attention should be paid here to a maximum and if possible uniform methane quality characterized more particularly by the Wobbe index. According to the Wobbe index, in the case of use of fuel gases, not only is the calorific value important, but also the density of the fuel gas used, in order thus to use the volume flow rate needed for a particular amount of energy. Secondary, excess or residual constituents such as $CO_2$ and $H_2$ alter both the calorific value and the Wobbe index.

A further problem at temperatures between 250° C. and 500° C. (at standard pressure) is coke formation over the catalyst in the presence of carbon monoxide. If the thermodynamic equilibrium composition has not yet been attained, for reasons of the rise in reaction rate with temperature, the aim should be a maximum reaction temperature locally in order to configure the reactor in a very compact and inexpensive manner.

On the other hand, there can be local temperature maxima, called hotspots, in the reaction space. There is a higher temperature here than in the rest of the reactor. The hotspots can firstly cause unwanted side reactions, resulting in formation of by-products that are unwanted, and some of which are removable from the main product with difficulty, if at all. Over and above a particular hotspot temperature, the catalyst can also be damaged irreversibly. Hotspot formation is therefore an additional problem that ultimately leads to catalyst deactivation. This problem is reduced by the use of a great excess of catalyst, or by the production of highly thermally stable catalysts that have been matched exactly to the existing conditions. This does not avoid any hotspot, but merely increases the reactor operation time without catalyst exchange. The consequence is a larger and hence more costly reactor or catalyst.

In the case of countercurrent cooling, the temperature profile in the catalyst bed at the reactor outlet usually approaches the coolant temperature. As a result, the hotspot, as a result of catalyst deactivation, moves gradually through the reactor and approaches the reactor outlet. At this time, the catalyst is exchanged.

One way of avoiding significant hotspots is the recycling of the product gas for inertization of the gas mixture entering a first reaction stage. This inertization with the product lowers the reaction rate, which necessitates a greater reactor volume. Moreover, this process is counterproductive for the preparation of methane of maximum purity.

It was an object of the present invention to overcome the disadvantages of the prior art and to provide a reactor, preferably microreactor, and a corresponding process regime which satisfy modern demands with regard to sustainable environmental protection as well.

The reactor is to assure maximum exploitation of heat, especially by means of a maximum end temperature in the heat transfer medium. Therefore, catalyst deactivation with inadequate cooling of the catalyst bed is to be avoided. The operating temperatures should also not be limited by coke formation that can lead to blockage—particularly in the case of micro-reactors.

In spite of the thermodynamic limitation of the $CO_2$ conversion, these conditions are to be fulfilled in a mixture of $CO_2$ and CO.

It is an object of the present invention to provide a suitable reactor that firstly assures adequate cooling of the reaction space in order to reduce and/or to avoid the disadvantages caused by hotspots.

On the other hand, excessive lowering of the temperature is also to be avoided since this can effectively lead to extinguishment of the reaction in the reaction space. This could theoretically be assured by a thick dividing wall between reaction space and cooling space.

This leads, however, to a high temperature gradient between these two spaces. A high temperature gradient in turn, however, leads again to formation of hotspots.

Frequently connected upstream of the methanation is a high-temperature electrolysis (HT electrolysis) in which hydrogen, oxygen and CO are produced from water vapor and $CO_2$. It was also an object of the present invention to use the waste heat from the methanation for production of process steam for the HT electrolysis. For this purpose, a maximum end temperature is to be achieved in the heat transfer medium, the cooling fluid. The electrolysis is not always effected to completion, and so residues of water vapor and $CO_2$ are present in the product of the electrolysis.

Methanation (methane formation, methane synthesis) from $H_2$ and CO and/or $CO_2$ is an exothermic reaction which is cooled in accordance with the invention by evaporation. The temperature in the catalyst bed for conversion of CO is preferably about 350° C.-450° C. This requires a high temperature for the evaporation. For optimal cooling, the boiling point of the cooling fluid would have to be matched to the temperature in the catalyst bed. However, this requires special coolants.

It is a further object of the present invention to provide an inexpensive process and the corresponding reactor.

SUMMARY OF THE INVENTION

This object is achieved by a reactor with a reactor shell, reaction space and cooling space and with fluid-tight separate inlets for at least one fluid reactant and for a cooling fluid, characterized in that there are at least two inlets for the cooling fluid each with at least one convoluted channel and column structure with reversal of flow.

A reversal of flow in the context of the invention is understood to mean deflection of the fluid stream or of the flow, especially deflection of the flow direction by 180 degrees. In other words, the fluid, after the reversal of flow, flows in countercurrent to the flow direction prior to the deflection. For example, the cooling fluid, after being fed in, can flow in countercurrent to the flow direction of the reactants in the reaction space and, after the deflection, i.e. after the reversal of flow by a channel structure, in cocurrent to the flow direction of the reactants in the reaction space and vice versa. A reversal of flow is thus also possible from co-current flow or the flow direction of the reactants in the reaction space to countercurrent.

Within a conduit, the cooling fluid always flows from the inlet to the outlet, or from reaction space entrance to reaction space exit. A deflection or reversal of flow thus does not take place within the conduit, but results from the guiding or location of the conduits and conduit regions relative to one another. The location of the individual regions of the conduit relative to one another results in accordance with the invention from superposed channel structures. In other words, the fluid conduit was convoluted. For convolution or for connection between two individual channel structures or between channel structure and inlet and outlet in and on the reactor or in and on the cooling space, column structures are needed.

According to the invention, the terms flow reversal, alteration of flow direction, reversal of flow, deflection of flow or of flow direction, especially by 180 degrees, are synonymous.

Axial refers to the direction or arrangement parallel to the reaction space and/or cooling space, or parallel to the flow within the reaction space and perpendicular to that is referred to as radial.

The channel structures are aligned axially, i.e. parallel to the flow direction of the reactants in the reaction space. The column structures are aligned perpendicularly thereto, i.e. radially.

In the context of the invention, the convoluted or superposed channel and column structures are arranged radially one on top of another; therefore, the channels or channel structures of a conduit, i.e. those regions of the conduit that are arranged axially, are radially superposed.

The inlets both for the at least one fluid reactant and for the cooling fluid are fluid-tight and accordingly also separated from one another in a fluid-tight manner.

The reaction space refers to that space in which the reaction takes place. The reaction space is a longitudinal void or channel having any cross section that has only two orifices: one for entry of the at least one reactant, preferably a reaction gas or gas mixture; and the other orifice opposite it for appearance of the reaction product. "Cooling space" in the context of the invention refers to that space in which the cooling fluid lowers the temperature in the reaction space by absorption of heat, while the temperature of the cooling fluid increases. According to the invention, inlets and outlets for the cooling fluid do not form part of the cooling space. The cooling space is connected to the inlet for the cooling fluid, reaches as far as the outlet and runs parallel to the reaction space. Nevertheless, there can also be absorption of heat by the cooling fluid in the inlets and/or outlets, i.e. lowering of the temperature in the reaction space, while the temperature of the cooling fluid is increased. The cooling space is an elongated void or channel having any cross section.

An essential feature of the invention is the structure of the inlets for the cooling fluid and/or the outlet for the cooling fluid within the reactor of the invention.

According to the invention, the inlet for the cooling fluid must have at least one reversal of flow before it runs parallel to the reaction space. The reversal of flow is achieved by a channel and column structure; "channel", the short form for channel structure, here means an elongated void parallel to the reaction space, or parallel to the flow direction in the reaction space and a column perpendicular thereto. Thus, the feed of the cooling fluid has at least one channel region parallel to the reaction space, or parallel to the flow direction in the reaction space, and at least one column region perpendicular to the reaction space, or perpendicular to the flow direction in the reaction space, that are connected upstream of the cooling space.

The column structures or columns are voids, regions and/or parts of the conduit for the cooling fluid that connect two channel structures or the inlet into or outlet out of the reactor and/or into and/or the cooling space, and hence enable fluid-tight conducting of the cooling fluid.

The channel structure is connected to the cooling space by means of the column structure, such that flow of the cooling fluid is reversed. The connection between cooling space and inlet is established by the at least one column structure, or by the last column structure proceeding from the entry of the cooling fluid.

The reversal of flow in the inlet for the cooling fluid is therefore important for the temperature retention in the reactor. As a result of the reversal of flow, the cooling fluid is heated more slowly, i.e. it is heated at greater distance from the reaction. In the case of rapid heating, the cooling fluid would take too much energy from the reaction, and so it would stop.

In one alternative, the at least two inlets are arranged in succession with regard to the flow in the reaction space.

The reactor has a pressure-stable reactor shell. "Pressure-stable" in the context of the invention is defined as a reactor shell that withstands even high pressures without damage. In the context of the invention, a high pressure is defined as 5-100 bar, preferably 10-50, more preferably 20-40, especially about 30 bar, with variations values of in each case 20%, preferably 10%, more preferably 5%, especially 3%.

In addition, in one alternative, reaction space, cooling space and/or inlets and outlets are likewise pressure-stable.

One execution of the reactor has at least one of the at least two inlets for the cooling fluid with at least two convoluted channel and column structures with reversal of flow.

The first inlet (the first with respect to the flow direction in the reactor space) here may have at least two convoluted channel and column structures, and the second or further inlets may have only one convoluted channel and column structure. In a further alternative, the first inlet has a convoluted channel and column structure and the second inlet, or each or one of the further inlets, has two convoluted channel and column structures. In a further alternative, any desired combination is possible. In one alternative, all inlets have the same number of convoluted channel and column structures.

The at least two inlets for the cooling fluid may therefore also have two or more reversals of flow; in other words, in the case of two reversals of flow, the inlet has two channel regions and two column regions before it opens into the cooling space.

In a further execution, the reactor has at least one outlet for the heated cooling fluid with at least one convoluted channel and column structure with reversal of flow.

The outlet for the cooling fluid is thus likewise configured like the inlets, meaning that it has at least one reversal of flow, i.e. one channel region and one column region. However, the outlet may also have two or more reversals of flow.

The reactor of the invention may, in one execution, have any desired combination of inlets and outlets with regard to their channel and column structure. Preferably, the at least two inlets each have two channel and column regions, the at least one channel and column region.

The configuration of the inlets and outlets for the cooling fluid with at least one convoluted channel and column structure with reversal of flow, i.e. deflection of flow direction, firstly facilitates the construction of the reactor and also ensures that the catalyst bed is cooled uniformly up to the end of the reactor. Especially since, in the case of layering of multiple levels of reaction spaces and cooling spaces, lateral branch-off streams that always contain a crossflow component are required.

The reversal of flow or deflection of flow results in an overlap of cocurrent and countercurrent with regard to the flow of the reaction gas.

In one design, the at least two inlets are disposed in the region of the first half of the reaction space.

Since the reaction space takes the form of an elongated void or channel with any cross section, its length is well defined. The first half refers to that half in which the opening for entry of the at least one reactant is present. In the context of the invention, "in the region of the first half of the reaction space" means that:

1. the reaction space is separated from the cooling space by a fluid-tight wall, i.e. a fluid-tight layer, and hence 2. reactor space and cooling space are arranged in parallel and hence the length of the cooling space is also defined, and 3. the column structure that connects the rest of the inlet to the cooling space is disposed in the first half of the cooling space in each case.

The first half of the cooling space thus corresponds to first the half of the reaction space since both are arranged in parallel; however, the absolute value of the length need not be identical.

In a further execution, the at least two inlets and/or the at least one outlet, in the region of the convoluted channel and column structures with reversal of flow, have different cross sections with regard to shape and/or area. In one alternative, the inlets and outlets differ from one another in cross section. In another alternative, individual regions of one or more inlets and outlets differ in cross section. In a further alternative, all combinations and mixed forms of the abovementioned alternatives are possible.

One execution relates to a reactor in which at least one inlet in at least one channel and/or column structure has sintered phases, sintered metals, fibers, cylinders and/or circular blanks. Sintered phases and/or fibers are preferably made from thermally conductive metallic or ceramic material with low flow resistance. Cylinders and/or circular blanks are made from inert material. This integration of additional material has the function of retaining liquid constituents of the cooling fluid or increasing the quality of evaporation.

In one execution, there is at least one catalyst in the reaction space, meaning that the reaction space is laden with at least one catalyst. Essential representatives for the methanation that should be mentioned here are the active elements Ru, Ir, Rh, Ni, Co, Os, Pt, Fe, Mo, Pd and Ag. If a support material for the active components is used, this may be a representative or a mixture of $TiO_2$, $Al_2O_3$, YSZ or $SiO_2$.

A further execution relates to a reactor which has, downstream of the outlet, a reactor portion with countercurrent cooling with at least one inlet for the cooling fluid having at least one convoluted channel and column structure with reversal of flow. According to the invention, the reactor portions of the reactor of the invention form a common reaction space and/or cooling space.

In such an alternative, the at least one outlet is not mounted at the end of the cooling space. Proceeding from the flow direction in the reactor space, the cooling space has at least one further inlet with at least one channel and column structure which is beyond the outlet.

In this alternative, therefore, the following arrangement is present in the reactor, proceeding from the entry of the reactants into the reaction space: In the region of the entry of the reactants into the reaction space, the at least two inlets are present in the first half thereof. The outlet for the cooling fluid is mounted in flow direction of the reactants or of the product that has already been formed. Following the flow direction in the reaction space, there is at least one further inlet, likewise with at least one channel and column structure, for the cooling fluid. Between this inlet and the outlets, the cooling fluid consequently flows in countercurrent based on the flow in the reaction space.

The reactor containing a second portion in which the cooling fluid is conducted in countercurrent may, in this portion, have a dedicated outlet for the cooling fluid, or the cooling fluid, as described above, is guided as far as the outlet for the cooling fluid in the first portion.

By virtue of the position of the at least two inlets for the cooling fluid in the first half of the reactor length, there is firstly a rise in the total heat resistance between evaporation zone and catalyst, such that there is no "blowout" of the reaction. In other words, the reaction does not stop owing to an excessively large drop in temperature. Evaporation at the hotspots along the reaction axis is also reduced in a self-regulating manner at the respective feed cell. If there exists a further inlet at the end of the reactor downstream of the outlet for the cooling fluid, by virtue of the countercurrent flow regime of cooling fluid and reaction, it is possible to generate another reaction space with low reaction temperature in which favorable thermodynamic boundary conditions for a conversion of $CO_2$ exceeding 70% can be achieved. In one alternative, commencing from the entry of the reactants into the reaction space, different catalysts can be used in cocurrent flow direction and in countercurrent flow direction. Essential representatives for the methanation in both flow regimes here include the active elements Ru, Ir, Rh, Ni, Co, Os, Pt, Fe, Mo, Pd and Ag. If a support material is used for the active components, this may be a representative or a mixture of $TiO_2$, $Al_2O_3$, YSZ or $SiO_2$. The catalyst materials used may be identical or different but may differ in terms of activity with respect to temperature. In the countercurrent flow regime, the properties of the catalyst material are optimized for higher activity at lower temperature, for example, by high dispersion or high surface area. This usually implies lower thermal stability.

In one execution of the present invention, the preparation of hydrocarbons, preferably the methanation, is effected in two sequential, separate reactors of the invention, preferably microreactors, in series.

In a first reactor the convention of essentially CO and in the downstream reactor the convention of essentially $CO_2$ is effected. The two reactors are laden with different catalysts. Essential representatives for the methanation in the two reactors that should be mentioned here are the active elements Ru, Ir, Rh, Ni, Co, Os, Pt, Fe, Mo, Pd and Ag. If a support material for the active components is used, this may be a representative or a mixture of $TiO_2$, $Al_2O_3$, YSZ or $SiO_2$. The catalyst materials used may be identical or different but may differ in terms of activity with respect to temperature. In the second reactor, the properties of the catalyst material are optimized for higher activity at lower temperature, for example, by high dispersion or high surface area. This usually implies lower thermal stability.

In a preferred execution, the fluid reactant is a fluid comprising or consisting of hydrogen and carbon monoxide and/or carbon dioxide. Secondary constituents may also be $N_2$ or water vapor.

In one execution of the present invention, the reactor contains heating elements on the opposite side of the reaction space from the cooling space. Preferably, the heating elements are round cartridges or flat plates made of thermally stable stainless steel having a filling of MgO for insulation of the heat conductor. The heat conductor consists of a resistance alloy.

In one execution, the reactor of the invention is in a sandwich design, meaning that it consists of multiple layers or strata mounted one on top of another and connected to one another in a fluid-tight manner.

In one alternative, the layers or strata are not flat but curved and form an outer shell in the manner of a hollow cylinder. The individual layers are then inserted into one another, preferably in a concentric manner in the case of hollow cylinders. However, a circular cross section is not absolutely necessary; instead, the cross section may also have any other desired shape.

In a further alternative, the layers or strata of the reactor of the invention in sandwich design are flat, i.e. not curved.

In the radial direction, the construction is as follows: The base is formed by a plate containing heating elements. Above that is a second plate. This has, at the bottom end, i.e. toward the plate containing heating elements, channels or slots that form the reaction space. Above that, at the upper end of the plate, there are channels or slots that form the cooling space. The plate that follows in radial direction has at least two column structures, i.e. continuous holes that open into the cooling space. At the top end of the plate there are mounted two channel structures, each proceeding from a column structure. These at least two channel and column structures are in the region of the first half of the reaction space. In the second half, toward the end of the reaction space, there is an analogous column and channel structure that forms the outlet. These form the inlet for the cooling fluid. In the radial direction following plate, there is one connection each for the inlet and outlet for the cooling fluid above the opposite end of the channel structure from the column structure.

In a further alternative, below the last plate with the connections for the cooling fluid, there is at least one further plate with columns and channel structure in order to achieve deflection of the cooling fluid. These further plates may have columns and channel structures for one inlet and/or outlet only, or else optionally for multiple inlets.

The levels that follow have the same construction of channel and column structures but offset in such a way that deflection of the cooling fluid with respect to flow direction takes place each time. The construction of the inlets and outlets for the cooling fluid is analogous. However, the inlets can have more deflections than the outlets for the cooling fluid.

Correspondingly, the plates that follow after the third plate then have column and channel structures for the inlet, but only column structures for the outlet. As the last plate in each case, the microreactor has a plate with continuous holes and connections for the inlet and outlet of the cooling fluid (water), optionally provided with valves. According to the invention, there are at least two inlets and one outlet.

In a further alternative, an analogous plate construction is also possible in the opposite, radial direction, proceeding from the same plate containing heating elements. In other words, the construction described in radial direction is mirrored at the central plate containing heating elements.

In the case of a construction with a mirror-image arrangement at the central plate, the microreactor thus contains, perpendicular to the central plate, at least two reaction spaces and the corresponding cooling spaces since the construction in both directions is perpendicular to the central plate. Within a level, there are at least two, preferably 2 or 3, reaction spaces and cooling spaces, such that the microreactor has a total of at least four (or correspond 6) reaction spaces with the accompanying cooling spaces.

In a further alternative, downstream of the output for the cooling fluid, there is at least one further inlet for the cooling fluid in the cooling space in the direction of flow in the reaction space, and this then cools the reaction space in countercurrent.

All channel structures and channels for reaction space and cooling space are preferably in a superposed arrangement in radial direction.

The individual plates, or strata and layers, of the reactor are bonded to one another in a fluid- and pressure-tight manner. According to the material, this is possible, for example, by laser welding, diffusion welding, electron beam welding or friction welding of any kind, screw connection or bonding and optionally sealing.

The individual layers are made of the following materials: stainless steels or nickel-base alloys, preferably 1.4301, 1.4404, 1.4571 and 1.4876 or 1.4958/9 and 2.4816. Further materials or alternatives used are heat-resistant plastics, for example Teflon, or else glass, glass fibers or carbon fibers.

The slots, channels or column and channel structures are produced in the respective plates by means known to the person skilled in the art, for example drilling, machining, wet-chemical etching or laser cutting, wire erosion or techniques from semiconductor production.

In the case of microreactors, especially made from silicon, techniques known from the production of semiconductors are also used, especially photolithography.

It is also possible to use different materials for different plates.

One execution of the present invention concerns a microreactor.

Microreactor in the context of the present invention means a reaction space having a height of 0.1-10 mm, preferably 0.2-5 mm, more preferably 0.5-3 mm, a width of 1-60 mm, preferably 1.5-50 mm, more preferably 2-40 mm, and a length of 1 to 40 cm, preferably 5-30 cm, more preferably about 10 cm; preferably with a cross section of 2×40 mm. The height of the cooling channels is 0.01-10 mm, preferably 0.05-5 mm, more preferably 0.1-2 mm, especially 0.5 mm; the structured width corresponds to the width of the reaction space. Preferably, the channel structures and/or column structures have a height and width of 1 mm in each case, especially 0.5 mm in each case.

In one execution of the present invention, the reactor walls between reaction space and cooling space or between the deflections of the cooling fluid, especially in a microreactor, have a thickness of 0.1 to 5 mm, preferably 0.1 to 3 mm, more preferably 0.1 to 2 mm. The walls within the (mini-)reactor between the deflections of the cooling fluid preferably have a thickness of 1 mm, especially 0.5 mm.

The surrounding reactor walls typically have a thickness of 2 to 10 mm, preferably 5 mm.

In one execution of the present invention, the reactor is constructed from a single block, but one having all the essential features such as reactor space, cooling space, channel and column structure, and connections for inlets and outlets. This is possible, for example, through the use of 3D printers.

In a further alternative, the reactor is fluid- and pressure-tight and optionally does not have a reactor shell.

An additional execution relates to the reactor of the invention connected in a fluid-tight manner to an upstream electrolysis apparatus. Optionally, the electrolysis apparatus and the reactor(s) according to experience are additionally connected in a fluid- and/or pressure-tight manner to heat exchanges, such that the system is a closed system for generation and/or storage of energy in hydrocarbons. All that has to be fed into this system is energy for electrolysis, $CO_2$ and optionally water.

The present invention thus further provides a system or an apparatus for generation and/or storage of energy in hydrocarbons, especially methane, constructed as follows:

A device for high-temperature electrolysis is supplied with power and has inlets for the reactants for the HT electrolysis: $H_2O$ and $CO_2$. The main products formed from the electrolysis are hydrogen, carbon dioxide and oxygen. By-products and residues of reactants removed from the electrolysis apparatus, as well as the aforementioned main products, are also $CO_2$ and $H_2O$. Oxygen $O_2$ is removed. In at least one heat exchanger, $O_2$ is cooled, at the same time preheating $CO_2$ as reactant for the HT electrolysis.

The further products $H_2$, $CO$ and unconsumed products $CO_2$ and $H_2O$ are likewise guided into at least one heat exchanger. $CO_2$ is likewise preheated as reactant for the HT electrolysis therein.

The $H_2$ and $CO$ products and unconsumed $CO_2$ and $H_2O$ reactants from the electrolysis, after a first heat exchanger, are optionally guided into a second. Water is preheated therein, and is used as cooling fluid in the reactor of the invention. After passage through the second heat exchanger for the $H_2$ and $CO$ products of the HT electrolysis (and the by-products and the unconsumed reactants $CO_2$ and $H_2O$), there is a gas-liquid separation. The liquid water removed is guided into the latter heat exchanger, where it is preheated with the rest of the water as cooling fluid for the reactor of the invention. The gaseous phase is guided into a further heat exchanger. $H_2$ and $CO$ and unconsumed $CO_2$ and possibly also remaining water vapor are preheated therein, before these are guided as reactants into the reactor of the invention. These are preheated by the hot, moist methane from the reactor(s) of the invention.

In the reactor of the invention, $CO$ and $H_2$ are reacted to give methane $CH_4$ and $H_2O$. In the reactor, at least a portion of the $CO_2$ and $H_2$ is not converted. The $CO_2$ may be wholly or partly removed and used as reactant in the HT electrolysis. The product from the reactor of the invention, i.e. more particularly $CH_4$, $H_2O$, but also unconverted $CO_2$ and which has not been led off either, and unconverted $H_2$ may, in one alternative, be guided into a further reactor of the invention. Methanation of $CO_2$ with $H_2$ takes place therein. This forms further methane and water. In another alternative, a reactor of the invention having a reactor portion with countercurrent cooling downstream of the outlet is used. In this second portion with countercurrent cooling, the $CO_2$ methanation then takes place correspondingly.

In the first alternative, there may likewise be countercurrent cooling in the second reactor connected in series. Remaining $CO_2$ from the second reactor can likewise be supplied as reactant to the HT electrolysis. The hot, moist methane is guided into a heat exchanger described above, in which the products from the HT electrolysis are preheated as reactants for the methanation. This heat exchange is followed by a gas-liquid separation. The gaseous, dry methane is led off from the system or device and stored or possibly used for energy generation. The remaining liquid phase, i.e. water, is fed to that heat exchanger which preheats the water as cooling fluid for the methanation by means of the heat from the products from the HT electrolysis.

The present invention also provides for the use of the reactor in a process for preparing hydrocarbons, preferably methane, or for the use of the reactor for preparation of hydrocarbons, preferably methane.

The invention further provides a process for operating a reactor of the invention.

In one execution, the process according to experience is conducted essentially in autothermal operation.

In the context of the invention, "essentially autothermal" means that the overall process, i.e. the overall process for preparing hydrocarbons (methane), is independent of external heat supply; the energy from the exothermic reactions is therefore provided to endothermic reactions or directly to the generation of gaseous cooling fluid. "Essentially" means that at least 60%, preferably at least 70%, more preferably at least 80%, of the energy demand for the overall process is covered without external heat supply. In one alternative, the reaction space, by means of heating elements, is protected from undercooling and hence extinguishment of the reaction. Therefore, the heating elements can be utilized exclusively for preheating.

The inventive preparation of hydrocarbons, preferably methanation, is effected under pressure, preferably 2 to 30 bar, more preferably 4-8 bar. Thus, the formation of coke by-product can be reduced and the methane produced can be more easily purified and stored. This is especially true when both $CO_2$ and water vapor, the starting materials for the electrolysis, are under pressure.

In one execution, the cooling fluid is fed in at a pressure of 5-100 bar, preferably 10-50, more preferably 20-40 bar, especially 30 bar.

An inexpensive process can be achieved through the use of water for cooling the exothermic formation of hydrocarbon, especially methanation. The water thus heated, or the water vapor thus formed, is used directly as reactant in the HT electrolysis in an SOEC (Solid Oxide Electrolysis Cell). In one execution, the cooling fluid is therefore water. In one alternative it is water vapor, and in another alternative superheated steam.

According to the invention, the term "water" likewise encompasses water vapor, both wet and dry steam, but also superheated steam and supercritical steam, and also dry-saturated steam. The cooling fluid, depending on temperature and pressure, may be present in one or more of these forms in the reactor, or is converted from one form to another. In one execution, in general, a cooling fluid used that undergoes at least one change of phase.

In order to achieve a boiling temperature of water as cooling fluid of 350° C., it would be necessary for a pressure of about 164 bar to exist in the cooling system, i.e. in the inlets for the cooling fluid and in the cooling space, which would make the process and the reactor very inconvenient and costly.

High pressures are firstly a risk. In order to reduce any hazard emanating from high pressure, there is a need for complex apparatuses and costly materials that withstand high pressures and do not exhibit any fatigue phenomena even over the long term.

If water vapor is to be utilized in the process of electrolysis and hence is to be produced slightly above the reaction pressure of the methanation process, a pressure of 10-40 bar is sufficient. At this pressure, water has a boiling point of about 180-250° C. Such a temperature possibly leads to extinguishment of the reaction over the catalyst; however, too thick a wall between the cooling fluid and the reaction space to a temperature gradient that likewise causes hotspots. The inventive reversal of flow of the cooling fluid in the inlets, i.e. the inventive channel and column structure of the inlet, results in delocalization of the evaporation, meaning that there is distribution of the cooling potential in time and space. If there is an excess increase in temperature at any point, the evaporation preferentially occurs at this point. If the increase in temperature migrates, the evaporation zone follows. Thus, hotspots over a prolonged period at particular sites are avoided and damage to the catalyst is suppressed.

In the process according to experience, the cooling fluid is fed in at a temperature of 0.1-30 Kelvin or degrees Celsius, preferably 1-20 and more preferably 5-10 Kelvin below the boiling temperature of the cooling fluid.

In the execution in which water is used as cooling fluid, the temperature is thus about 150° C. or higher.

The feed rate of cooling fluid per inlet can be regulated according to the degree of activation of the catalyst. The regulation here is effected by a temperature measurement at the respective feed points. If a temperature exceeds the target specification the volume flow rate is increased, and vice versa. In this way, it is also possible to observe and compensate for deactivation in the catalyst.

The regulation of the feed rate prevents blowout, extinguishment of the reaction at the start of the reactor. Hotspot formation is likewise avoided at the subsequent injection sites. According to the invention, the injection sites are those sites at which the feeds of the cooling fluid into the cooling space take place.

In a further execution, the temperature in the reaction space/catalyst bed is 100-800° C., preferably 200-700° C., more preferably 300-500° C. More particularly, there are regions of different temperature in the reaction space; in other words, there is an axial temperature spread, with temperatures from a minimum of 100° C. to a maximum of 800° C.

In one execution, the entry temperature of the reaction gas into the reactor is between 250 and 450 degrees Celsius, preferably 300 and 400° C., especially about 350° C., with variations of 10%, preferably 5%, especially 3%. Variations are defined as deviations in accordance with the invention, i.e. a variation of 10% with respect to the preferred temperature of 350° C. means a temperature between 315 and 385° C.

In addition, the temperature differential between the entry temperature of the reaction fluid and the entry temperature of the cooling fluid, in one alternative, is 10-300° C., preferably 50-250° C., more preferably 100-150° C.

In one execution, the cooling of the reactor results in heating of the cooling fluid by 20 to 300° C., preferably 100-200° C.

When water is used, therefore, the outlet temperature is 400 to 450° C., with a maximum temperature spread axially in the catalyst bed of 300 to 500° C.

In a further execution, a waste product from the reaction in the reaction space is used as cooling fluid.

In one alternative, what is called the water of reaction, i.e. the water formed as by-product in the methanation, is used for cooling of the methanation. In one alternative, it is preheated by cooling of reactants or cooling of the product stream.

In one execution, at least two reactors are connected in series in a fluid-tight manner, the first being cooled by means of a co-current flow regime and the second by means of a countercurrent flow regime.

In one alternative, reactants introduced into the reactor of the invention as reaction gas are the product of an HT electrolysis, preferably in an SOEC, i.e. a gas mixture containing (as essential) constituents or consisting of H2, CO and $CO_2$.

The heated cooling fluid from the reactor(s) of the invention is fed in as water vapor in the HT electrolysis.

In one execution, the reactor of the invention can be operated as follows: a maximum of 450° C. as reactor temperature. The products leave the reactor at a temperature of 350-400° C. The reaction takes place at a pressure of 5 bar.

The HT electrolysis used is a SOEC (solid oxide electrolysis cell). The electrolysis is effected at 730-850° C. and attains a conversion of 60% CO2 and 70% H2O. CO2 and H2O are fed in in a ratio of 0.2:0.8 to 0.1:0.9. Here too, the electrolysis is effected under a pressure of 5 bar.

CO2 is likewise fed in at a pressure of 5 bar. Feeding of water under atmospheric pressure. CO2 and H2O are fed in at a temperature of about 20° C. The cooling water used has a temperature of 7-15° C.

The reactor of the invention and the process, especially the inventive operation of the reactor, show the following advantages:

Deflection of the cooling fluid, i.e. the presence of at least one channel and column structure at the reactor outlet, i.e. at the outlet for the cooling fluid for the steam produced, facilitates construction and ensures that the catalyst bed is cooled uniformly up to the end of the reactor since, in a sandwich construction of multiple strata, lateral branches for media supply or removal in the reactor always inevitably entail a crossflow component.

The number of reversals can be used to move the position of the boiling operation in radial direction between the levels, and the separately controlled supply of the cooling fluid (different amounts are thus also possible) to control the heat flow withdrawn from the catalyst. In this way, the temperature profile in the catalyst bed is also controllable in axial direction without extinguishing the reaction.

As a result, the abovementioned subdivision of the reaction zone into various regions is effected by different lengths of the channel structures and/or number of deflections, i.e. number of column structures, in order to influence the heat flow and the temperature profile in axial direction.

The use of water of reaction for cooling of the methanation—preheated by cooling of reactant or product stream—saves energy expenditure for provision of ion-free water.

The reactor is very compact (outer dimensions smaller at least by a factor of 10) compared to the prior art, and is thus usable in mobile, turnkey container- or skid-based installations. As a result of reduction of the hotspot, there is barely any catalyst deactivation, and hence there is also a distinct reduction in the risk of extinguishment of the reaction and maintenance-related advantages (greater maintenance intervals).

The cooling fluid has a high exit temperature (about 400-450° C.) and is thus suitable for direct recycling of the heat of reaction into the HT electrolysis process.

The process shows minor limitation with regard to the $CO_2$ conversion (low purification complexity of the synthetically produced methane) in mixtures of CO and $CO_2$ with hydrogen as occur in a co-electrolysis of $H_2O$ vapor and $CO_2$ to $H_2$ and CO.

Moreover, only low costs arise owing to minor catalyst deactivation.

The compact design assures extremely rapid heating/cooling, such that dynamic operation with changes of load is possible in a very simple manner. This is advantageous particularly with utilization of surplus power.

The use of two series-connected reactors or of one reactor with flow direction of the cooling fluid in the cooling space in co- and countercurrent to the flow regime in the reaction space provides separate zones/reactors for CO and $CO_2$ conversion (CO is converted preferentially over the standard catalysts and $CO_2$ must compete for catalyst sites), with the options of using different catalysts in the two reactors, i.e. first a catalyst for CO conversion with higher stability with respect to temperature and coking, then subsequently a catalyst for the $CO_2$ conversion with higher specific activity at lower temperatures.

Such a construction also allows the use of reactors of different size or of one reactor with zones of different size with regard to the regions in which there is co- and countercurrent flow in the cooling space relative to the flow regime in the reaction space. The size of the reactors or zones is guided by the $CO/CO_2$ ratio.

Therefore, according to the invention, not only the heat flow in radial direction but also the temperature profile of the overall reactor in axial direction is influenced by the connection. For instance, by appending a second reactor or reactor portion with optionally reversed flow direction, a maximum value for the temperature in the cooling medium is achieved at the connection site of the two coolant exits. This has advantages in the utilization of the coolant for further heating purposes. The reversal of the flow direction between the reactors or reactor segments allows the combination of the reduction of the temperature peak in the front region of the first reactor through the adjustment of the heat transfer in different axial zones with superheating of the vapor toward the end of the first reactor or reactor segment. In the second reactor or reactor segment, it is then possible, by virtue of controlled cooling to distinctly lower temperatures via pure countercurrent operation, also to use another catalyst in order to move the thermodynamic equilibrium in the direction of the products of the reaction.

The reactor of the invention and the process, especially the inventive operation of the reactor, find use in the natural gas industry/power industry: for production of synthetic natural gas (SNG) for feeding into the natural gas grid or for natural gas tank farms by means of surplus power.

In addition, it is possible to use $CO_2$ emitters that provide reactants: utilization of the emissions (for example from biogas or in the cement industry or in combined heat and power plants) for production of synthetic natural gas (SNG) by means of surplus power.

In addition, it is thus possible to store excess power and overcapacities of power in the power grid are avoided.

The advantages of the device or system of the invention for production and/or storage of energy in hydrocarbons lie in maximum recovery of the heat from every operating step, a low temperature of the heat source which is used for stabilization of the system. This is below 300° C. Moreover, optimization of the ratio of CO2 to H2 for the methanation is achieved. Moreover, only a minimum of purification of the methane produced is necessary. A further advantage of the system or device of the invention is a virtually autothermal process into which it is necessary to feed only a little water if any. Water consumption is thus also reduced to a minimum.

There follows a description of individual executions of the present invention via figures. However, these are not intended to restrict the subject matter of the invention, but merely to represent individual executions or alternatives.

BRIEF DESCRIPTION OF THE DRAWINGS

In the accompanying drawings.

DETAILED DESCRIPTION OF EMBODIMENTS OF THE INVENTION

Figure 1:
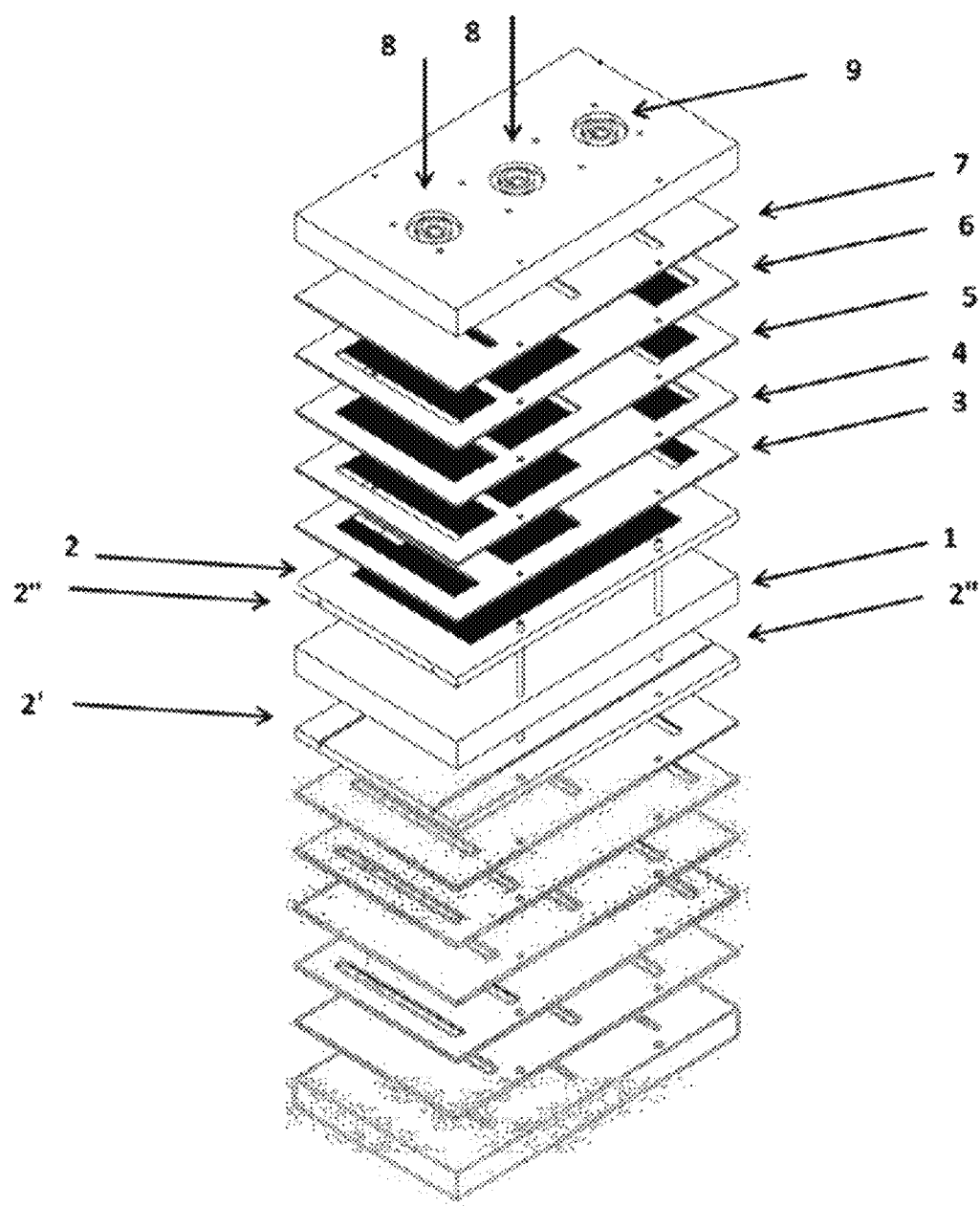
FIG. 1 shows the construction of a reactor composed of individual layers.

FIG. 1:

FIG. 1 shows the construction of a reactor composed of individual plates (strata, layers). Proceeding from a central plate 1 optionally provided with heating elements, the construction proceeds by means of different plates in both directions in a mirror-symmetric manner. Therefore, the plates 2 and 2' are mirror-symmetric and also have the same features in mirror-symmetric form. The construction of the reactor of the invention proceeds in an analogous manner with the further plates 3, 4, 5, 6, 7, which are also continued in a mirror-symmetric manner in the other, opposite direction. The plate 2 contains continuous slots at the lower end, i.e. toward the central plate. Analogous slots 2" are to be found on the lower plate 2'. On completion of welding of the stack, it is possible to draw a wire through these slots 2" and to remove the material between two slots on the respective plate 2 or 2' by means of wire erosion to generate the reaction space. The central plate forms the lid for the reaction space. The plates in the first stratum 2 and 2' have further slots on the side remote from the central plate, and these are covered by the subsequent plate 3, 3' and form the cooling space.

Subsequently, construction in the upward direction is effected by further plates 4-7 which have the channel and column structures, formed by slots and holes. The last plate has connections for the inlet of the cooling medium 8 and for the outlet 9 thereof. There is a corresponding mirror-symmetric construction from the central plate downward, as becomes clear in the figure.

Figure 2:
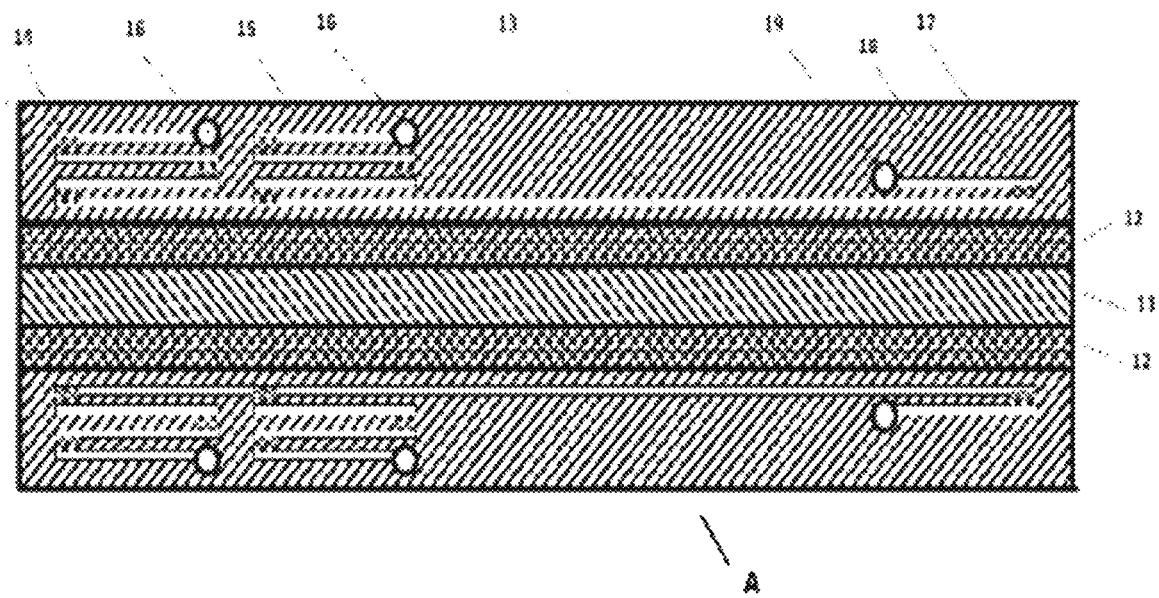
FIG. 2 shows a reactor of the invention in cross-section.

FIG. 2:

FIG. 2 shows a reactor of the invention in cross section. Proceeding from a central plate 11, there are reaction spaces 12 in mirror-symmetric form above and below. Above each there is a cooling space 13. The inlet 16 for the cooling fluid is characterized by a convoluted structure of channels 15 and columns 14. In the present case, the inlet has three of these convoluted structures. In this alternative, the outlet for the cooling fluid 19 is likewise via a structure of channels 18 and columns 17.

Figure 3:
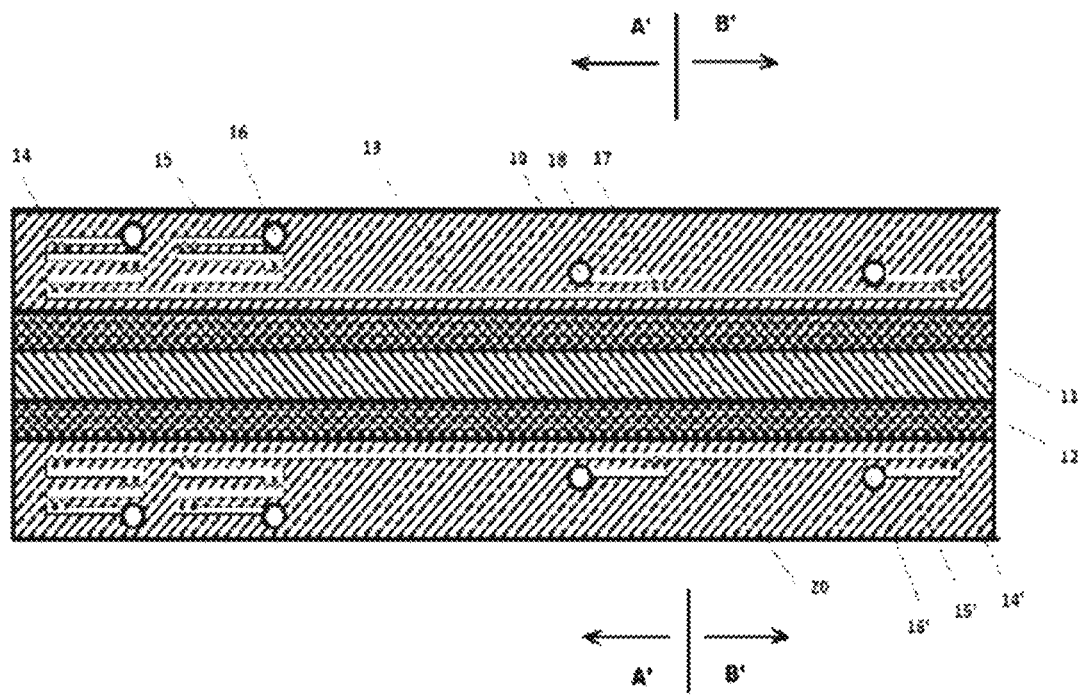
FIG. 3 shows the reactor of FIG. 2 which downstream of the outlet, has a reactor portion with countercurrent cooling with an inlet for the cooling fluid.

FIG. 3:

FIG. 3 in one describes the execution in which the reactor of the invention, downstream of the outlet, has a reactor portion with countercurrent cooling with an inlet for the cooling fluid. The first reactor portion A' was described in FIG. 2. The second reactor portion B' is characterized by a further inlet for the cooling fluid 16' which has a structure of channels 15' and columns 14'.

Figure 4:
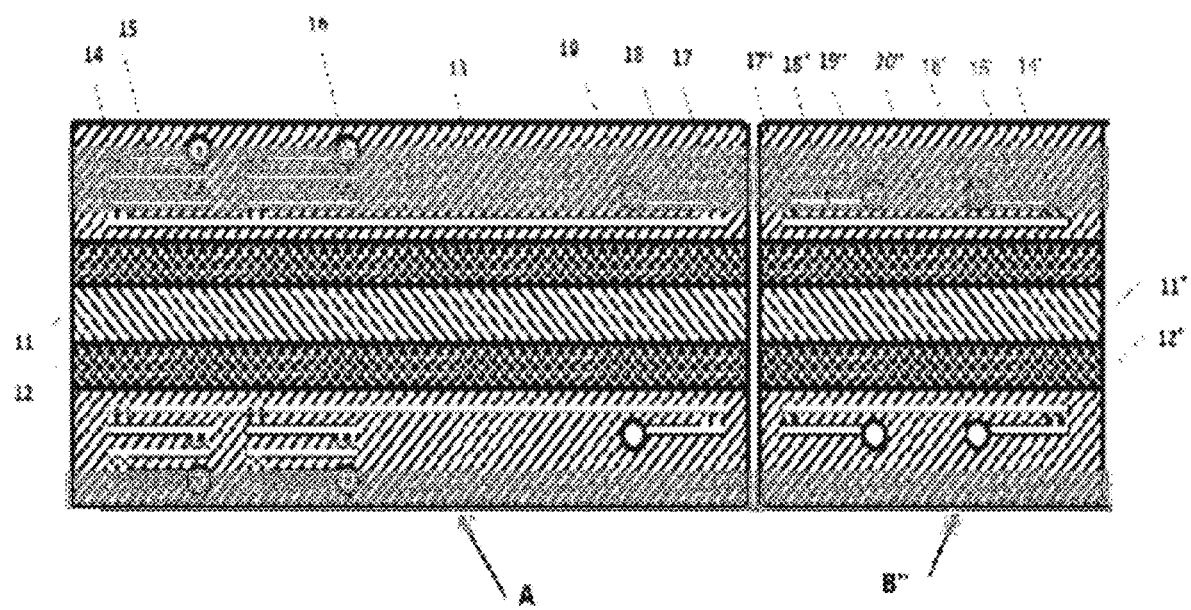
FIG. 4 shows two the reactor of FIG. 2 and the reactor of FIG. 3 which are connected.

FIG. 4:

In FIG. 4 describes an execution in which two reactors of the invention are shown, which may be connected in series. The first reactor A is shown in FIG. 2. The second reactor B" corresponds to the second part of reactor B' from FIG. 3. It likewise has a second plate or level 11" and an adjoining reaction space 12". In addition, the second reactor B" has an inlet 1' for the cooling fluid with a structure of channels 15' and columns 14'. In addition, the second reactor has an outlet for the cooling fluid 19" likewise with a structure of channels 18" and columns 17". The cooling in the cooling space 20" is effected in countercurrent to the flow in the reactor space 12".

Figure 5:
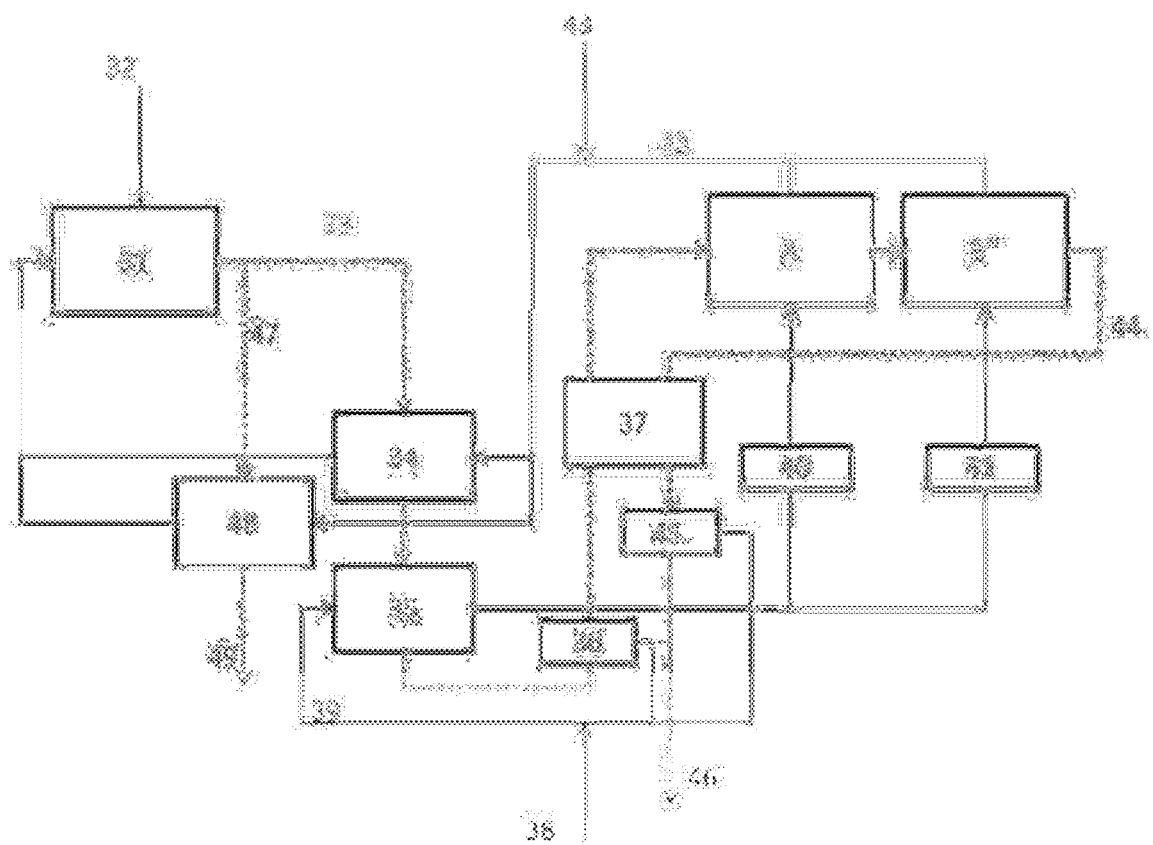
FIG. 5 schematically shows the execution of the system of the invention or of the device for production and/or storage of energy in hydrocarbons.

FIG. 5:

FIG. 5 describes an execution of the system of the invention or of the device for production and/or storage of energy in hydrocarbons, especially methane. A device for high-temperature electrolysis 31 is supplied with power 32. Water and carbon dioxide are fed in as reactants. One of the products from the electrolysis which is led off is oxygen 47. Further products are hydrogen and carbon monoxide, which contain residual constituents of carbon dioxide and water or water vapor, 33. These are cooled in the heat exchanger 34 and then in 35. Downstream of a gas-liquid separation 36, hydrogen and carbon monoxide, including residual constituents, are fed to an inventive reactor A. In this inventive reactor with co-current flow in the reaction space and cooling space, the methanation of carbon monoxide takes place. This reactor is connected to a second inventive reactor B". In this reactor there is countercurrent flow in the cooling space with respect to the reaction space. The further methanation of carbon monoxide and especially of carbon dioxide takes place here. Moist methane, as the reaction product from the two inventive reactors 44, is cooled against the reactants of reactor A by means of the heat exchanger 37. Water 39 is removed in a gas-liquid separation 45 and is fed to the heat exchanger 35. The dry methane 46 is removed from the system as product and stored or used directly. In the heat exchanger 35, the water 39 separated from the reaction product is heated by the products of the electrolysis 33 and guided to the heat exchangers 40 and 41. The heat exchangers 40 and 41 are therefore additional heaters that are fed electrically, by combustion or some other source of extraneous heat. Subsequently, the heated water as cooling fluid with a temperature close to the boiling point is guided into inventive reactors A and B".

The water which was used as cooling fluid and is now in gaseous form is guided from the inventive reactors A and B" via the heat exchanger 34 to the electrolysis. Upstream of the heat exchanger 34, carbon dioxide 43 is fed in as reactant for the electrolysis. In the heat exchanger 34, therefore, the reactants for the electrolysis are heated against the products of the electrolysis.

Oxygen 47 is present as a further product of the electrolysis, and is cooled in the heat exchanger 48 and can be discharged from the system as product 49 and stored or used directly. The heat exchanger 48 is connected in parallel with heat exchanger 34 and likewise heats the reactants for the electrolysis.

The system is fluid- and pressure-tight. Water 38 can be fed into the system if appropriate.

What is claimed is:

1. A reactor, wherein the reactor comprises a reactor shell, a reaction space, a cooling space, and fluid-tight separate inlets for at least one fluid reactant and for at least one cooling fluid, there being at least two inlets for the at least one cooling fluid each with at least one convoluted channel and column structure with reversal of flow, and wherein the reactor is connected in a fluid-tight manner to an upstream electrolysis apparatus.

2. The reactor of claim 1, wherein the reactor shell is a pressure-stable reactor shell.

3. The reactor of claim 1, wherein at least one of the at least two inlets for the cooling fluid comprises at least two convoluted channel and column structures with reversal of flow.

4. The reactor of claim 1, wherein the reactor further comprises at least one outlet for heated cooling fluid which comprises at least one convoluted channel and column structure with reversal of flow.

5. The reactor of claim 1, wherein the at least two inlets are disposed in a region of a first half of the reaction space.

6. The reactor of claim 1, wherein the at least two inlets and/or at least one outlet for heated cooling fluid which comprises at least one convoluted channel and column structure with reversal of flow have different cross sections with regard to shape and/or area in a region of the convoluted channel and column structures with reversal of flow.

7. The reactor of claim 1, wherein at least one inlet for the at least one cooling fluid in at least one column structure comprises sintered phases, sintered metals, fibers, cylinders or circular blanks.

8. The reactor of claim 1, wherein the reaction space is loaded with a catalyst.

9. The reactor of claim 1, wherein the reactor comprises, downstream of an outlet, a reactor portion with countercurrent cooling comprising at least one inlet for the cooling fluid which has at least one convoluted channel and column structure with reversal of flow.

10. The reactor of claim 1, wherein the at least one fluid reactant is a fluid comprising hydrogen and carbon monoxide and/or carbon dioxide.

11. The reactor of claim 1, wherein the reactor is a microreactor.

12. A process for preparing hydrocarbons, wherein the process comprises preparing the hydrocarbons by using a reactor which comprises a reactor shell, a reaction space, a cooling space, and fluid-tight separate inlets for at least one fluid reactant and for at least one cooling fluid, there being at least two inlets for the at least one cooling fluid each with at least one convoluted channel and column structure with reversal of flow.

13. The process of claim 12, wherein an essentially autothermal operation is conducted.

14. The process of claim 12, wherein the cooling fluid is fed in at a pressure of from 5 bar to 100 bar.

15. The process of claim 12, wherein the cooling fluid is fed in at a temperature of from 0.1 Kelvin to 30 Kelvin below a boiling temperature of the cooling fluid.

16. The process of claim 12, wherein a temperature in the reaction space/catalyst bed is from 100° C. to 800° C.

17. The process of claim 12, wherein a temperature differential between an entry temperature of the reaction fluid and an entry temperature of the cooling fluid is from 10° C. to 300° C.

18. The process of claim 12, wherein a waste product from the reaction in the reaction space is used as cooling fluid.

19. The process of claim 12, wherein at least two reactors are connected in series in a fluid-tight manner, the first reactor being cooled by a co-current flow regime and the second reactor being cooled by a countercurrent flow regime.

20. A reactor, wherein the reactor comprises a reactor shell, a reaction space, a cooling space, and fluid-tight, separate inlets for at least one fluid reactant and for at least one cooling fluid, wherein the reactor comprises at least two inlets for the at least one cooling fluid each comprising at least one convoluted channel and column structure with reversal of flow, wherein the reactor comprises at least a discharge line for warmed cooling fluid, which comprises at least one convoluted channel and column structure with reversal of flow, a channel structure being an elongated cavity parallel to a flow direction in the reaction space and a column structure being an elongated cavity perpendicular to a flow direction in the reaction space, a column structure being part of a conduction of the cooling fluid, which connects two channel structures and thus enables a fluid-tight conduction of the cooling fluid, wherein the reaction space is loaded with a catalyst, and wherein the cooling space succeeds at least one of the at least two inlets for the cooling fluid, extends to the discharge line and runs parallel to the reaction space.

21. The process of claim 12, wherein the process is a methanation.

* * * * *